(12) United States Patent
Schoch

(10) Patent No.: US 6,594,597 B1
(45) Date of Patent: Jul. 15, 2003

(54) PRESS RESIDUAL LIFE MONITOR

(75) Inventor: Daniel A. Schoch, Minster, OH (US)

(73) Assignee: The Minster Machine Company, Minster, OH (US)

( * ) Notice: Subject to any disclaimer, the term of this patent is extended or adjusted under 35 U.S.C. 154(b) by 10 days.

(21) Appl. No.: 09/679,002

(22) Filed: Oct. 4, 2000

Related U.S. Application Data
(60) Provisional application No. 60/159,715, filed on Oct. 15, 1999.

(51) Int. Cl.[7] ................................................. G06F 11/32
(52) U.S. Cl. ........................................................ 702/81
(58) Field of Search .............................. 417/63; 702/81, 702/8; 73/579, 661, 570; 192/103; 705/36, 14; 364/550; 51/325

(56) References Cited

U.S. PATENT DOCUMENTS

| | | | |
|---|---|---|---|
| 4,116,050 A | 9/1978 | Tanahashi et al. | |
| 4,359,841 A | * 11/1982 | Barth et al. | 51/325 |
| RE31,750 E | 11/1984 | Morrow | |
| 4,502,332 A | * 3/1985 | Sheridan et al. | 73/661 |
| 4,520,674 A | 6/1985 | Canada et al. | |
| 4,612,620 A | 9/1986 | Davis et al. | |
| 4,633,720 A | 1/1987 | Dybel et al. | |
| 4,885,707 A | 12/1989 | Nichol et al. | |
| 4,980,844 A | 12/1990 | Demjanenko et al. | |
| 5,094,107 A | * 3/1992 | Schoch | 73/570 |
| 5,251,151 A | 10/1993 | Demjanenko et al. | |
| 5,332,366 A | * 7/1994 | Anderson | 417/63 |
| 5,428,556 A | 6/1995 | Torizawa et al. | |
| 5,440,499 A | 8/1995 | Rasmussen | |
| 5,689,442 A | * 11/1997 | Swanson et al. | 364/550 |
| 5,777,228 A | * 7/1998 | Tsuboi et al. | 73/579 |
| 6,035,286 A | * 3/2000 | Fried | 705/36 |
| 6,244,412 B1 | * 6/2001 | Schmitz | 192/103 |
| 6,347,302 B1 | * 2/2002 | Joao | 705/4 |

* cited by examiner

Primary Examiner—John Barlow
Assistant Examiner—Tung Lau
(74) Attorney, Agent, or Firm—Randall J. Knuth

(57) ABSTRACT

A method and apparatus for determining the original warranty and extended warranty for a mechanical device. A value indicative of the severity of the use of a mechanical device is utilized to develop a value of original warranty and a value of extended warranty. Extended warranty information may additionally be used to offer an automatic buyback of the mechanical device.

32 Claims, 3 Drawing Sheets

PRESS RESIDUAL LIFE MONITOR

CROSS-REFERENCE TO RELATED APPLICATIONS

This application relates to and claims the benefit under 35 U.S.C. §119 of Provisional Application Ser. No. 60/159,715 filed Oct. 15, 1999 by the same inventor.

BACKGROUND OF THE INVENTION

1. Field of the Invention

The present invention relates to mechanical devices and, more particularly, to a method and apparatus for determining warranty periods for mechanical devices.

2. Description of the Related Art

Most mechanical systems, including mechanical presses, have a certain operational lifetime based upon their construction material, their structure, and general dynamic and static loads placed thereon. Manufacturers warrant their products for a particular length of time based upon certain assumptions of customer use and abuse of the apparatus and time of operation.

Currently, the warranty period for a mechanical device, such as a mechanical press, is based upon inaccuracies, such as predicted use conditions and run time. These current methods of determining warranty do not account for certain usage which may adversely effect the mechanical device more quickly than other less abusive usage, nor do they account for time of use which is greater than or less than the predicted amount. For this reason, a mechanical device owner does not have an accurate way to predict the impact of a particular application of the mechanical device. Also, manufacturers do not have accurate means to measure the impact of device application so that they may suggest that the owner take reasonable maintenance procedures to keep the device in good operating condition, offer extended warranties, or offer an automatic buyback program.

Operating mechanical devices, for example, mechanical presses, at particular speed, force, or load levels may have a greater impact on the longevity of the mechanical device. In these cases, the impact on the device may be amplified in such a way that the magnitude of the force or load is not an accurate indicator of the effect of these applications on the longevity of the mechanical device.

What is needed in the art is a way to monitor production operation conditions in a secure and confirmed way so that warranty periods for a particular mechanical device, for example, a mechanical press, may be accurately determined and offers of extended warranties or automatic buyback programs may be offered without risk to the manufacturer. Known problems with load sensors and other ways of accumulating load data on mechanisms include the fact that customers sometimes disengage such-load accumulators and/or counters and thereby undercount or underaccumulate the total use or force applied against the machine.

What is additionally needed in the art is a way to accurately determine the original warranty and actual production use of a mechanical device. Extended warranty could then be accurately determined at the conclusion of the original warranty by subtracting the actual production use from the original warranty. This calculation of extended warranty could be used in many ways, such as automatically offering the purchaser an extended warranty or offering an automatic buyback program.

What is further needed in the art is a system to monitor the actual production use of a machine to assist the customer in keeping particular machine applications within an identified limit.

SUMMARY OF THE INVENTION

The present invention is directed to improve upon the ability to accurately generate a measure of warranty for a mechanical device (e.g. a mechanical press) and to provide a method and apparatus for generating a measure of actual production use of the mechanical device so that an extended warranty may be accurately determined, or a substantially risk-free buyback program may be implemented.

The present invention provides a method and apparatus for determining the original warranty and extended warranty of a mechanical device, which includes developing an indicator of use severity that provides an accurate indicator of the impact of different applications on the longevity of the mechanical device.

The invention, in one form thereof, comprises a method of generating of measure of warranty for a mechanical device. The first step of this method is to develop an indicator of use severity for the mechanical device. Use severity is a quantity which relatively indicates how a particular use of a mechanical device impacts the longevity of the mechanical device. A high value of use severity is indicative of an application of the mechanical device which has a greater impact on the longevity of the mechanical device, whereas a low value of use severity would indicate an operation of a mechanical device which would less severely impact the longevity of the mechanical device. The next step of this method is to determine the maximum recommended use severity level. The maximum recommended use severity level is a use severity level beyond which the mechanical device should not be operated. This method further includes the steps of: determining the hours of operation for the original warranty period, providing a computational device and computing the original warranty use severity life for the mechanical device based upon the maximum recommended use severity level and hours of operation for the original warranty period. The maximum recommended use severity level is multiplied by the hours of operation to determine the original warranty period.

The invention, in another form thereof, comprises a method of generating a measure of warranty for a mechanical device. In this form, this method includes the steps of: generating a cumulative measure of actual production use severity of the mechanical device for the original warranty period and computing the extended warranty use severity life remaining at the conclusion of the original warranty period for the mechanical device based upon the original warranty use severity life and the cumulative measure of actual production use severity. Extended warranty use severity life is a cumulative measure of use severity which remains at the conclusion of an original warranty and is computed by subtracting the actual production use severity from the original warranty use severity life.

The invention, in another form thereof, comprises a method of generating a cumulative measure of the actual production use severity of the mechanical device. This method includes the steps of: determining a count quantity for the mechanical device, monitoring the actual production use severity of the mechanical device, monitoring the count quantity of the mechanical device, tabulating actual production use severity versus count quantity, and computing a cumulative actual production use severity value for the original warranty period based upon the tabulated use severity versus count quantity values. Tabulated use severity versus count quantity values are summed over count quantity to produce a cumulative measure of the actual production use severity of the mechanical device which has units of (use severity •count quantity).

The invention, in another form thereof, comprises a method of generating a measure of the extended warranty for a mechanical device. In one form, this method comprises the steps of: computing the average actual production use severity for the original warranty period and computing the extended warranty period based upon the extended warranty use severity life remaining at the conclusion of the original warranty period for the mechanical device and the average actual production use severity for the original warranty period. Extended warranty use severity life remaining at the conclusion of the original warranty is divided by the average actual production use severity for the original warranty period to determine the extended warranty period. In another form of the current invention, this method comprises the steps of: computing actual production use severity over discrete time intervals of equal length based upon the average actual production use severity measured over the discrete time interval and the length of the time interval, computing the extended warranty remaining at the conclusion of the first discrete time interval based upon the extended warranty use severity life and the actual production use severity for the first discrete time interval, and computing the extended warranty remaining at the conclusion of each discrete time interval based upon the previously determined extended warranty remaining at the conclusion of the previous discrete time interval and the use severity of each discrete time interval. In this way, extended warranty is continuously computed.

The invention, in another form thereof, comprises a method for calculating a measure of the extended warranty of a mechanical device which includes setting the measure of the extended warranty to zero if the monitored use severity of the mechanical device exceeds the maximum recommended use severity level.

The invention, in another form thereof, comprises a method of generating a measure of warranty for a mechanical device which comprises the steps of: calculating a measure of the extended warranty and offering an automatic buyback of the mechanical device if the measure of the extended warranty is above a predetermined measure.

The invention, in another form thereof, comprises a method of generating a measure of warranty for a mechanical press. This method includes the steps of: determining the maximum recommended vibration severity level, determining the hours of operation for the original warranty period, providing a computational device, and computing the original warranty vibration severity life based upon the maximum recommended vibration severity level and hours of operation for the original warranty period. In this way, the maximum recommended vibration severity level is multiplied by the hours of operation for the original warranty period to compute a measure of the original warranty vibration severity life.

The invention, in another form thereof, comprises a method of generating a measure of warranty for a mechanical press. This method includes the steps of: generating a cumulative measure of the actual production vibration severity use of the mechanical press for the original warranty period and computing the extended warranty vibration severity life remaining at the conclusion of the original warranty period for the mechanical press based upon the original warranty vibration severity life and the cumulative measure of actual production vibration severity. In this way, the cumulative measure of actual production vibration severity is subtracted from the original warranty vibration severity life to compute a value of the extended warranty vibration severity life.

The invention, in another form thereof, comprises a method of generating a measure of warranty for a mechanical press which includes the step of: generating a cumulative measure of the actual production vibration severity use of the mechanical press. In this form, the step of generating cumulative measure of the actual production vibration severity use of the mechanical press includes the steps of: determining a count quantity for the mechanical press, monitoring the actual production vibration severity of the mechanical press, monitoring the count quantity of the press, tabulating actual production vibration severity versus count quantity, and computing a cumulative actual production vibration severity value for the original warranty period based upon the tabulated vibration severity versus count quantity values. In this way, the tabulated vibration severity values are summed over count quantity to achieve a value of cumulative actual production vibration severity which has units of (use severity •count quantity).

The invention, in another form thereof, comprises a method of generating a measure of warranty for a mechanical press. This method involves the use of vibration severity in determining the original warranty, actual production use, and the extended warranty. In one form, this method includes the step of: providing a sensor security device for verifying that the sensed vibration severity level is valid for the press.

The invention, in another form thereof, comprises a method of generating a measure of warranty for a mechanical press. This method includes the step of: generating a cumulative measure of the actual production vibration severity use of a mechanical press. In this form, this step includes: setting run time as the count quantity for the mechanical press, monitoring the actual production vibration severity of the mechanical press, monitoring the run time of the press, tabulating actual production vibration severity versus run time, computing a cumulative actual production vibration severity value for the original warranty period based upon the tabulated vibration severity versus run time values, and providing a crank shaft sensor for detecting the crankshaft rpm of the press so that it may be compared with the sensed run time and vibration severity to provide a backup check to ensure that the devices which monitor the vibration severity and run time of the press have not been altered or disconnected.

The invention, in another form thereof, comprises a method of generating a measure of warranty for a mechanical press which includes the steps of: providing a computational device and providing a tamper proof enclosure for the computational device.

The invention, in another form thereof, includes the step of generating a cumulative measure of the actual production vibration severity use of a mechanical press. In one form, this step comprises: generating a unique press vibration severity/reliability zone chart, generating vibration severity zone life acceleration factors corresponding to the zones of the vibration severity/reliability zone chart, comparing the monitored actual production vibration severity to the vibration severity/reliability zone chart to determine in which reliability zone the press is operating, associating the monitored actual production vibration severity with the appropriate zone life acceleration factor, computing a weighted actual production vibration severity value using the monitored actual production vibration severity and the appropriate vibration severity zone life acceleration factor, recording weighted actual production vibration severity values vs. time, and computing a cumulative actual production vibration severity value using the weighted actual production vibration severity values vs. time. In this way, recorded weighted actual production vibration severity values versus time are summed over count quantity to compute a cumulative value of actual production vibration severity which has units of (vibration severity •time).

The invention, in another form thereof, includes the step of generating a unique press vibration severity/reliability zone chart. This step includes: running a press through a plurality of continuously recurring cycles; monitoring and recording the speed of the press, monitoring and recording the load exerted by the press; monitoring and recording vibration severity magnitude velocity induced in the press utilizing a vibration sensor, for example, an accelerometer means attached to the press; plotting the recorded vibration severity magnitude on a load vs. speed graph; varying the speed and the load of the press and repeating the previous steps until a plurality of vibration magnitudes are recorded; and defining curves of equal vibration severity magnitudes on the graph to divide the graph into a plurality of zones representing different vibration magnitudes.

The invention, in another form thereof, comprises a method of generating a measure of warranty for a mechanical press which includes the step of calculating a measure of the extended warranty. In one form, this step includes: computing the average weighted actual production vibration severity for the original warranty period and computing the extended warranty period based upon the extended warranty vibration severity life remaining at the conclusion of the original warranty period for the mechanical press and the average weighted actual production vibration severity for the original warranty period. In another form, this step includes: computing vibration severity use over discrete time intervals of equal length based upon the average actual production vibration severity measured over the discrete time interval and the length of the time interval, computing the extended warranty remaining at the conclusion of the first discrete time interval based upon the extended warranty vibration severity life and the actual production vibration severity use for the first discrete time interval, and computing the extended warranty remaining at the conclusion of each discrete time interval based upon the previously determined extended warranty remaining at the conclusion of the previous discrete time interval and the vibration severity use for each discrete time interval. In this way, extended warranty is continuously computed.

The invention, in another form thereof, comprises a method for calculating a measure of the extended warranty of a mechanical press which includes setting the measure of the extended warranty to zero if the monitored vibration severity of the mechanical press exceeds the maximum recommended vibration severity level.

The invention, in another form thereof, includes a counter for sensing a count quantity for the press. The counter can be, for example, a run time sensor which senses whether the press is operating. The invention further includes a vibration sensor, for example, an accelerometer for sensing vibration severity of the press. The vibration sensor is attached to the press. A vibration severity life monitor, for example, a microprocessor is communicatively connected to the counter and the vibration sensor. The vibration severity life monitor tabulates sensed information such as, count quantity and vibration severity. The vibration severity life monitor stores an original warranty value and computes a value of extended warranty based upon the original warranty and the tabulated and stored information.

The invention, in another form thereof, includes a vibration sensor and a vibration severity life monitor. A sensor security device is communicatively connected to both the vibration sensor and the vibration severity life monitor. The sensor security device receives the vibration severity value from the vibration sensor and determines whether the sensed vibration severity level is within an acceptable range for the press being monitored.

The invention, in another form thereof, includes a zone factor device which is, for example, a microprocessor. The zone factor device stores a vibration severity zone chart for the press being monitored as well as a plurality of zone life acceleration factors which correspond to the vibration severity zones on the vibration severity zone chart. The zone factor device receives sensed vibration values and communicates these sensed vibration values along with corresponding vibration severity zone chart information to the vibration severity life monitor.

The invention, in another form thereof, includes a crankshaft sensor which detects a crankshaft rpm value for the press. A display device displays information that is tabulated and computed in the vibration severity life monitor. The display device is communicatively connected to the vibration severity life monitor.

The invention, in another form thereof, includes a first tamper proof housing which surrounds the vibration severity life monitor and a second tamper proof housing which surrounds the sensor security device.

An advantage of the present invention is that it permits summation or accumulation of vibration severity level data over the actual life time of use of the mechanical press thereby forming a record of such use. When such use of mechanical presses can be determined under such confirmed, controlled conditions, it may be possible to accurately compute an extended warranty or offer a substantially risk-free buyback.

Another advantage of the present invention is that operating conditions which have a greater impact on the longevity of the mechanical device are weighted accordingly to determine accurate measures of warranty.

A further advantage of the present invention is that such use of an accumulating vibration severity or use severity monitor may confirm that vibration severity or use severity has been under control at all times, which will increase the salability of the press.

A further advantage of the invention is that by accumulating and displaying the total vibration severity or use severity applied against the mechanical press, preventive maintenance and other replacement operations may be done prior to actual failure or reduction in utility of particular components of the press, thereby reducing overall maintenance costs.

Yet another advantage of the present invention is that it creates a documented record of the complete operational history of the press which enhances the customer's resale payback, if they would ever wish to resell the press. Presses would have higher resale values if an accurate measure of past press use could be communicated to a potential purchaser.

Yet another advantage of the invention is that an automatic buyback built/re-builder could be possible for the press if at any time during the press life vibration severity application could be confirmed. Based upon known historical trends of vibration severity analysis, it would be possible to determine how much "operational life" the press maintains prior to any necessary rebuild or overhaul maintenance.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
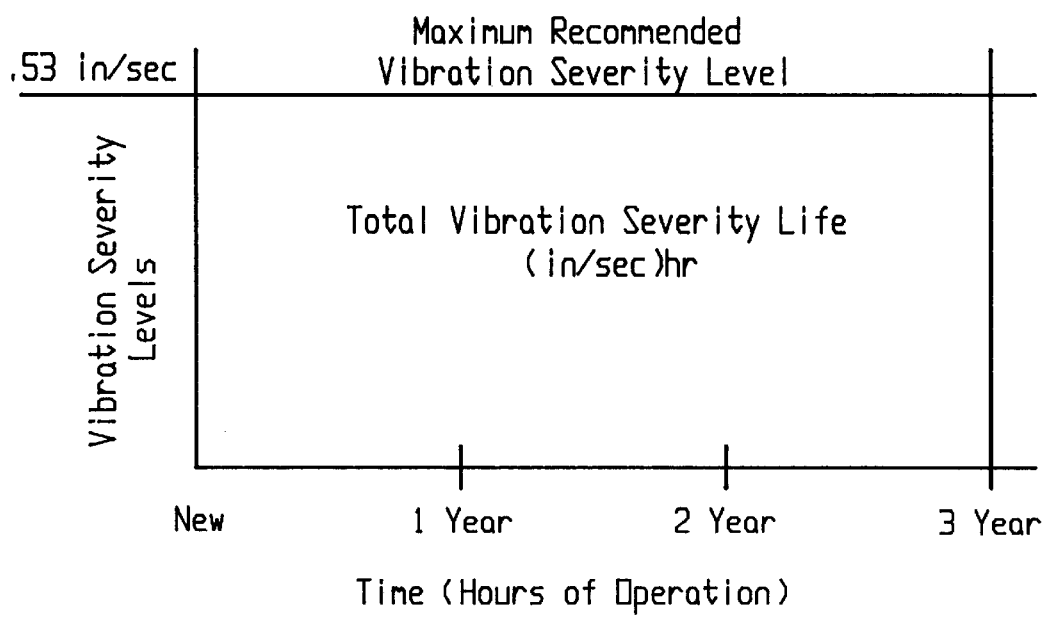
FIG. 1 is a graphical representation of the total vibration severity life of a mechanical press.

Referring now to the drawings and particularly to FIG. 1, there is shown a graph of the total vibration severity life, or original warranty of a mechanical press. Total vibration severity life is determined by multiplying the maximum recommended vibration severity level by hours of operation for the original warranty period. Vibration severity is measured during actual press production and accounts for dynamic effects as described in U.S. Pat. No. 5,094,107 which is assigned to the assignee of the present invention and is explicitly herein incorporated by reference.

The total amount of area beneath the maximum recommended vibration severity level over the hours of operation for the original warranty period of the press is termed the total vibration severity life, or original warranty of the press. In terms of an operational parameter, this total vibration severity life of the press is equal to the amount of usage available.

Figure 2:
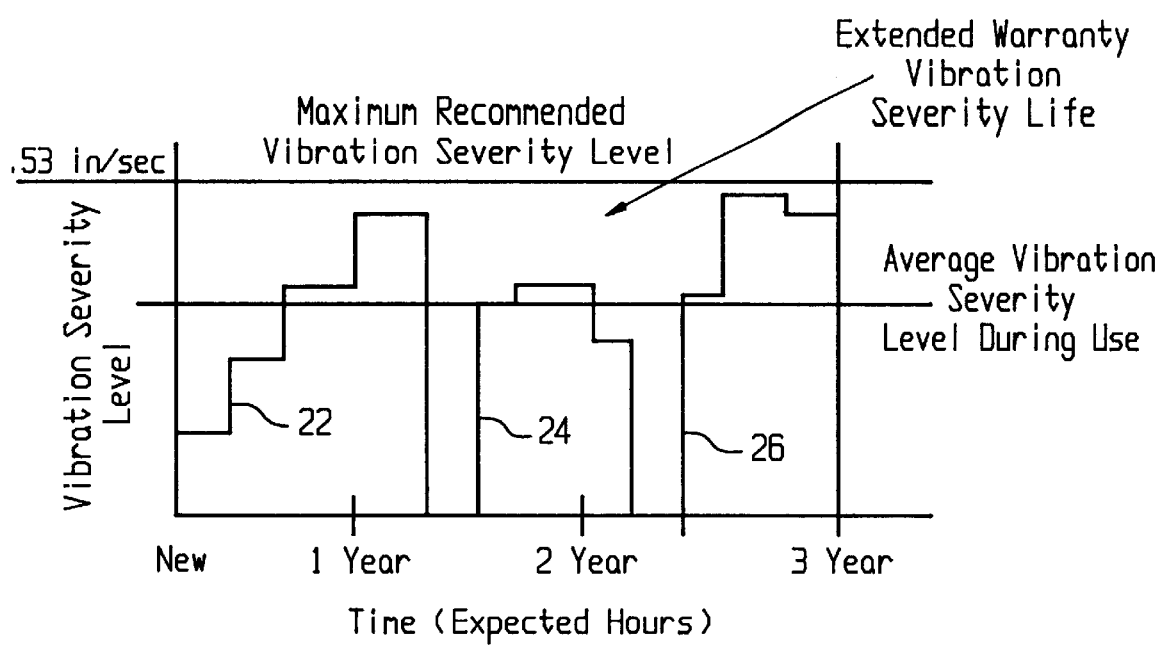
FIG. 2 is a graphical representation of a possible vibration severity record measurement of actual production use over time showing the average vibration severity level during use and a measure of extended warranty vibration severity life.

FIG. 2 is a graphical representation of the maximum recommended vibration severity level, average vibration severity level during use, vibration severity vs. time and extended warranty vibration severity life for a particular example press. Lines 22, 24 and 26 depict the vibration severity level, measured over time, for a particular example press.

In the example press illustrated by FIG. 2, no use of the press has exceeded the maximum recommended vibration severity level. The average vibration severity level during use for the example press which is illustrated in FIG. 2 is below the maximum vibration severity level. In a situation where the average vibration severity level during use for a particular press is below the maximum recommended vibration severity level, an extended warranty vibration severity life is available. To determine extended warranty vibration severity life, actual production vibration severity use must first be determined. For the example press illustrated in FIG. 2, actual vibration severity use would be computed by determining the area under the graphs defined by Lines 22, 24 and 26. The actual production vibration severity use for this example press would be the sum of these three areas. Extended warranty can then be computed by subtracting the actual production vibration severity use from the total vibration severity life, or original warranty, which is depicted in FIG. 1.

The present invention, by monitoring the press at all times and operational levels, will be able to accurately determine extended warranty vibration severity life. Extended warranty vibration severity life could be computed on a regular basis, so that a press operator could at any time determine the impact of his accumulated use on the potential for obtaining an extended warranty or participating in an automatic buyback program. Updating extended warranty vibration severity life at regular intervals would also provide the press operator with a more accurate indication of the resale value of his particular press.

Figure 3:
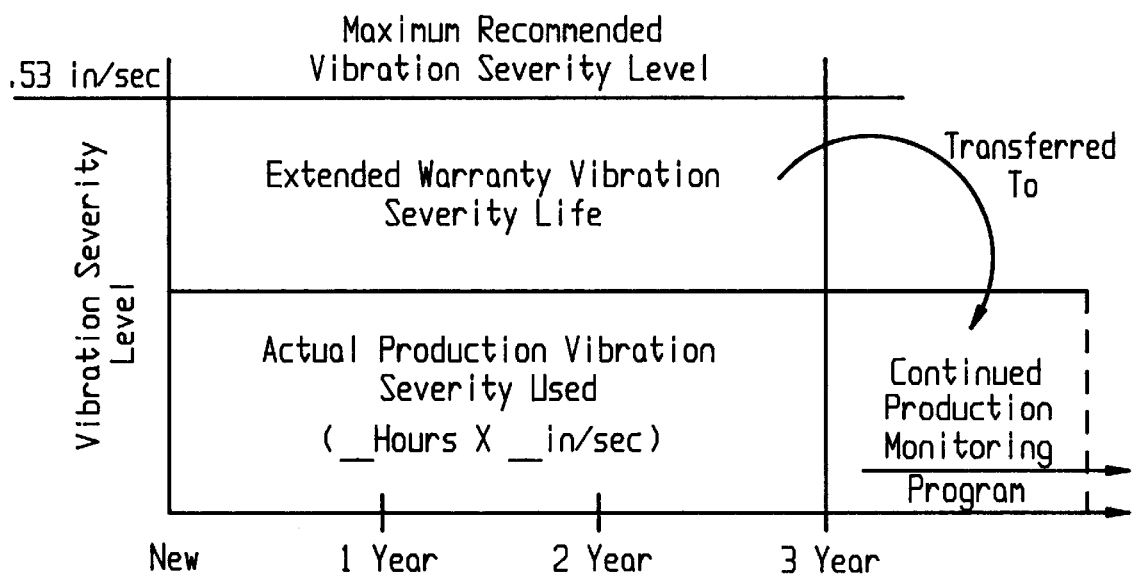
FIG. 3 is a graphical representation of a possible actual production vibration severity use and the measure of extended warranty vibration severity life.

FIG. 3 shows the transferal of the confirmed extended warranty vibration severity life into a continued production monitoring program. This additional "production life span" permits extra use of the press without additional danger, risk or cost. This additional use, still available in the press, may be the basis for an extended warranty program or a change in the market value of the press, if the press would ever be resold.

Figure 4:
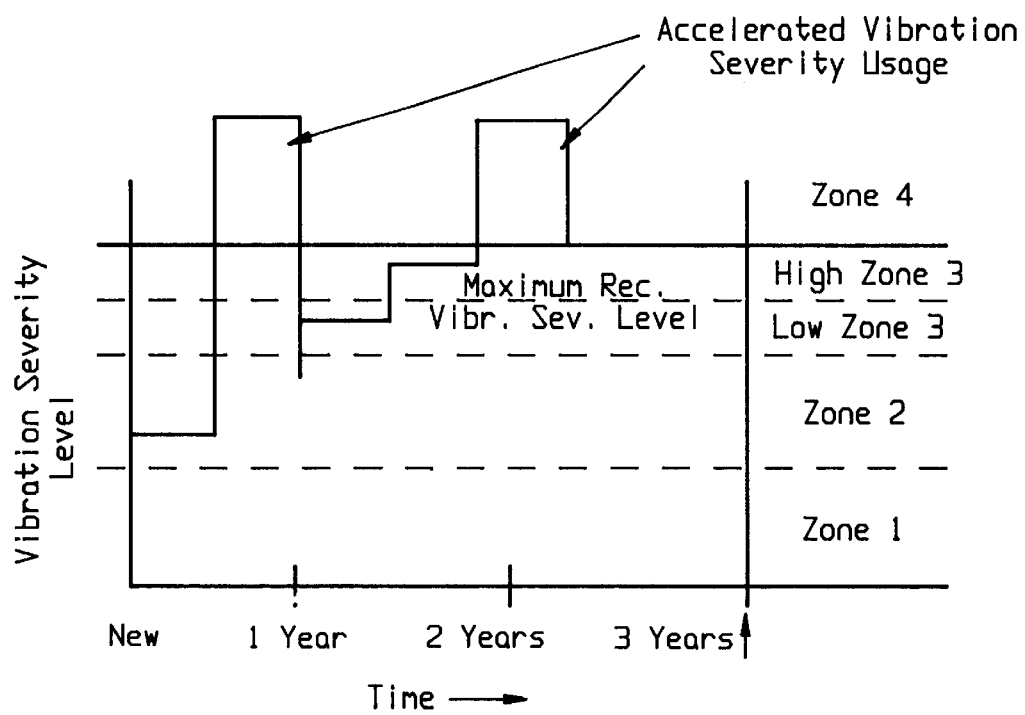
FIG. 4 is a graph of a press with a possible vibration severity level, which shows examples of accelerated vibration severity usage.

The vibration severity level of the press may be weighted heavier depending upon the vibration severity level and actually "cost" more in terms of the total vibration severity life of the press. FIG. 4 graphically shows examples of accelerated vibration severity usage. The vibration severity usage is more accurately calculated by multiplying the vibration severity of the press by a zone life acceleration factor which corresponds to the vibration severity zone in which the press is currently operating. Using vibration severity zone life acceleration factors provides a more accurate measure of vibration severity use.

Figure 5:
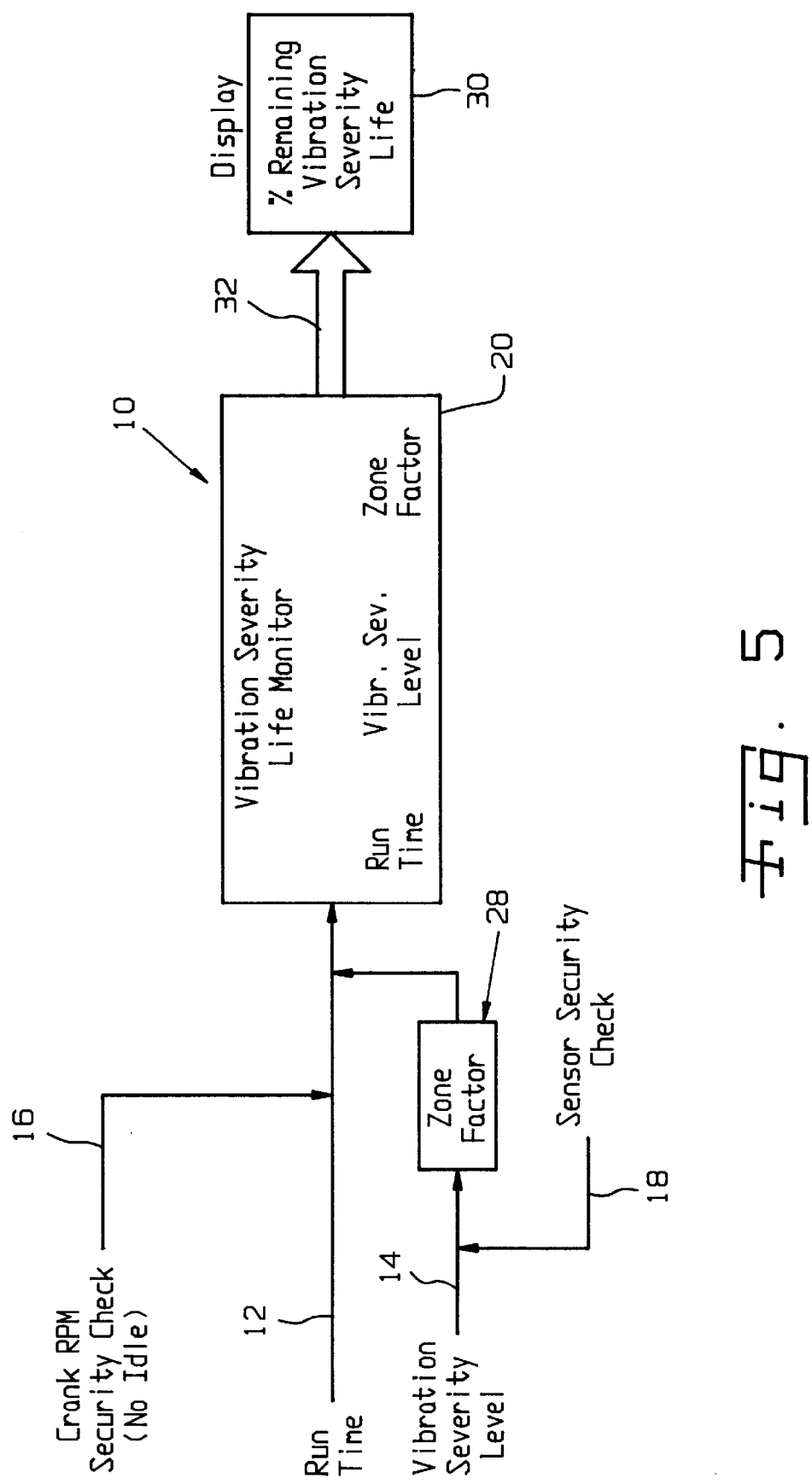
FIG. 5 is a diagrammatic view of the present invention.

FIG. 5 illustrates, in diagrammatic form, a device for implementing the current invention. Vibration severity life monitor 10 receives a signal from the press on/off switch which allows the vibration severity life monitor to obtain run time information. Run time information is communicated from the on/off switch to the vibration severity life monitor through communication line 12.

Vibration severity level of the running press is measured according to the teachings of U.S. Pat. No. 5,094,107. Vibration severity level measured in this way is communicated by communication line 14. Located along communication line 14, sensor security check 18 receives sensed vibration severity level information and performs a check to ensure that the vibration severity level is valid for the particular press on which the unit is operating. Communication line 14 transfers vibration severity level information to zone factor unit 28. Zone factor unit 28 compares the sensed vibration severity level to the vibration severity zone chart which has been computed for the press so that the appropriate vibration severity zone life acceleration factor may be associated with the current monitored vibration severity. Zone factor unit 28 includes a computational unit which is preferably a microprocessor which is able to store the vibration severity zone chart for the press being monitored, compare the monitored vibration severity level to the zone chart so that the zone of operation may be determined and associate the proper vibration severity zone life acceleration factor with the monitored vibration severity level.

Vibration severity life monitor 10 also includes a sensor (not shown) to determine the crankshaft rpm of the monitored press so that idling of the press may be accounted for and sensor security may be identified. Press speed data is compared to the run time to provide a backup check to ensure that the vibration severity and run time sensors have not been altered or disconnected.

Vibration severity life monitor 10 includes a computational unit 20 preferably a microprocessor, which accumulates and stores monitored vibration severity as well its associated vibration severity zone life acceleration factor versus time. A predetermined maximum recommended vibration severity level and a value of the hours of operation corresponding to the original warranty period are entered into computational unit 20. This information is used to determine the original warranty vibration severity life for the press in question. Vibration severity life monitor 10 multiplies monitored vibration severity by its associated vibration severity zone life acceleration factor to compute weighted actual production vibration severity use for the press at any particular point in time. The vibration severity life monitor 10 sums the weighted actual production vibration severity use over time. The cumulative actual production vibration severity use computed by the vibration severity life monitor is subtracted from the original warranty vibration severity life for the particular press so that the extended warranty vibration severity life may be determined. In the configuration illustrated by FIG. 5, the vibration severity life monitor 10 computes a percent remaining original warranty vibration severity life value. The vibration severity life monitor is additionally able to compute percent original warranty vibration severity life used, sensor status, projected run hours at current vibration severity level, current vibration severity level, and current vibration severity zone. In the configuration illustrated in FIG. 5, the percent residual vibration severity life is communicated via communication line 32 to display 30. In this way, the operator of this mechanical press can know the percent vibration severity life remaining on his particular press at any point in time.

Although in the preferred embodiment of the invention, severity use levels have been described and taught as vibration severity levels, other alternative system parameters may be utilized in a similar fashion. Such variables may be determining how many times a clutch is energized, the number of starts or stops of a machine, the number of times of brake use and the brake use severity, the average level of acceleration of the device and/or forces on the suspension or frame of the system, types of use, and maximum impact.

As taught, the biggest variable in reliability product is how the product is used. The present invention utilizes twenty-four hour, seven days a week monitoring to accurately capture use of the device. Such system monitor would, of necessity, need to be housed in a tamper resistant or secure location to prevent unauthorized access or changing of the totals or settings.

As it has been described in the preferred embodiment, a mechanical press is fitted with the device or the method may be applied thereto. Alternatively, other mechanical devices may be similarly applied or connected to the apparatus, or method applied thereto.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of generating a measure of warranty for a mechanical device, comprising:

developing an indicator of use severity for the mechanical device;

determining the maximum recommended use severity level, the maximum recommended use severity level being a use severity level above which the mechanical device should not be operated;

determining the hours of operation for the original warranty period;

providing a computational device; and computing the original warranty use severity life for the mechanical device based upon the maximum recommended use severity level and hours of operation for the original warranty period.

2. The method of claim 1, further comprising:

generating a cumulative measure of actual production use severity of the mechanical device for the original warranty period; and computing the extended warranty use severity life remaining at the conclusion of the original warranty period for the mechanical device based upon the original warranty use severity life and the cumulative measure of actual production use severity.

3. The method of claim 2, wherein said step of generating a cumulative measure of the actual production use severity of the mechanical device comprises:

determining a count quantity for the mechanical device;

monitoring the actual production use severity of the mechanical device;

monitoring the count quantity of the mechanical device;

tabulating actual production use severity versus count quantity; and computing a cumulative actual production use severity value for the original warranty period based upon the tabulated use severity versus count quantity values.

4. The method of claim 3, further comprising:

calculating a measure of the extended warranty.

5. The method of claim 4, further comprising:

offering an automatic buyback of the mechanical device if the measure of extended warranty is above a predetermined measure.

6. The method of claim 4, further comprising:

setting the measure of the extended warranty to zero if the monitored use severity of the mechanical device exceeds the maximum recommended use severity level.

7. The method of claim 4, wherein said step of calculating a measure of the extended warranty comprises:

computing the average actual production use severity for the original warranty period; and computing the extended warranty period based upon the extended warranty use severity life remaining at the conclusion of the original warranty period for the mechanical device and the average actual production use severity for the original warranty period.

8. The method of claim 4, wherein said step of calculating a measure of the extended warranty comprises:

computing actual production use severity over discrete time intervals of equal length based upon the average actual production use severity measured over the discrete time interval and the length of the time interval;

computing the extended warranty remaining at the conclusion of the first discrete time interval based upon the extended warranty use severity life and the actual production use severity for the first discrete time interval; and computing the extended warranty remaining at the conclusion of each discrete time interval based upon the previously determined extended warranty remaining at the conclusion of the previous discrete time interval and the use is severity for each discrete time interval.

9. A method of generating a measure of warranty for a mechanical press, comprising:

determining the maximum recommended vibration severity level, the maximum recommended vibration severity level being a use severity level above which the mechanical press should not be used;

determining the hours of operation for the original warranty period;

providing a computational device; and computing the original warranty vibration severity life based upon the maximum recommended vibration severity level and hours of operation for the original warranty period.

10. The method of claim 9, further comprising:

generating a cumulative measure of the actual production vibration severity use of the mechanical press for the original warranty period; and computing the extended warranty vibration severity life remaining at the conclusion of the original warranty period for the mechanical press based upon the original warranty vibration severity life and the cumulative measure of actual production vibration severity.

11. The method of claim 10, wherein said step of generating a cumulative measure of the actual production vibration severity use of a mechanical press comprises:

determining a count quantity for the mechanical press;

monitoring the actual production vibration severity of the mechanical press;

monitoring the count quantity of the press;

tabulating actual production vibration severity versus count quantity; and computing a cumulative actual production vibration severity value for the original warranty period based upon the tabulated vibration severity versus count quantity values.

12. The method of claim 11, further comprising:

providing a sensor security device for verifying that the sensed vibration severity level is valid for the press.

13. The method of claim 11, further comprising:

setting run time as the count quantity for the mechanical press;

providing a crank shaft sensor for detecting the crankshaft rpm of the press so that it may be compared with the sensed run time and vibration severity to provide a backup check to ensure that the devices which monitor the vibration severity and run time of the press have not been altered or disconnected.

14. The method of claim 11, further comprising:

providing a tamper proof enclosure for the computational device.

15. The method of claim 10, wherein said step of generating a cumulative measure of the actual production vibration severity use of a mechanical press further comprises:

generating a unique press vibration severity/reliability zone chart;

generating vibration severity zone life acceleration factors corresponding to the zones of the vibration severity/reliability zone chart;

comparing the monitored actual production vibration severity to the vibration severity/reliability zone chart to determine in which reliability zone the press is operating;

associating the monitored actual production vibration severity with the appropriate zone life acceleration factor;

computing a weighted actual production vibration severity value using the monitored actual production vibration severity and the appropriate vibration severity zone life acceleration factor;

recording weighted actual production vibration severity values vs. time; and computing a cumulative actual production vibration severity value using the weighted actual production vibration severity values vs. time.

16. The method of claim 15, wherein said step of generating a unique press vibration severity/reliability zone chart comprises:

running a press through a plurality of continuously recurring cycles;

monitoring and recording the speed of the press;

monitoring and recording the load exerted by the press;

monitoring and recording vibration severity magnitude velocity induced in the press utilizing a vibration sensor, for example, an accelerometer means attached to the press;

plotting the recorded vibration severity magnitude on a load vs. speed graph;

varying the speed and the load of the press and repeating the previous steps until a plurality of vibration magnitudes are recorded; and defining curves of equal vibration severity magnitudes on said graph to divide the graph into a plurality of zones representing different vibration magnitudes.

17. The method of claim 15, further comprising: calculating a measure of the extended warranty.

18. The method of claim 17, further comprising:

offering an automatic buyback of the mechanical press if the measure of extended warranty is above a predetermined measure.

19. The method of claim 17, further comprising:

setting the measure of the extended warranty to zero if the monitored vibration severity of the mechanical press exceeds the maximum recommended vibration severity level.

20. The method of claim 17, wherein said step of calculating a measure of the extended warranty comprises:

computing the average weighted actual production vibration severity for the original warranty period; and computing the extended warranty period based upon the extended warranty vibration severity life remaining at the conclusion of the original warranty period for the mechanical press and the average weighted actual production vibration severity for the original warranty period.

21. The method of claim 17, wherein said step of calculating a measure of the extended warranty comprises:

computing vibration severity use over discrete time intervals of equal length based upon the average actual production vibration severity measured over the discrete time interval and the length of the time interval;

computing the extended warranty remaining at the conclusion of the first discrete time interval based upon the extended warranty vibration severity life and the actual production vibration severity use for the first discrete time interval; and computing the extended warranty remaining at the conclusion of each discrete time interval based upon the previously determined extended warranty remaining at the conclusion of the previous discrete time interval and the vibration severity use for each discrete time interval.

22. An apparatus for monitoring the residual warranty of a mechanical press, comprising:

a counter for sensing a count quantity for the press;

a vibration sensor, for sensing vibration severity values, said vibration sensor attached to the press; and a vibration severity life monitor for tabulating the vibration severity values and information associated with the vibration severity values versus time, said vibration severity life monitor stores an original warranty value and computes a value of extended warranty based on the tabulated and stored information, said vibration severity life monitor communicatively connected to said run time sensor and said vibration sensor.

23. The apparatus as recited in claim 22, wherein said counter is a run time sensor for sensing whether the press is operating.

24. The apparatus as recited in claim 22, further comprising:

a sensor security device, for receiving the vibration severity values from said vibration sensor, said sensor security device determining whether the sensed vibration severity level is within an acceptable range for the press, said sensor security device communicatively connected to said vibration sensor, for example, an accelerometer and said vibration severity life monitor.

25. The apparatus as recited in claim 22, further comprising:

a zone factor device for storing a vibration severity zone chart associated with the press and a plurality of zone life acceleration factors corresponding to a plurality of vibration severity zones which form a part of said vibration severity zone chart, said zone factor device communicatively connected to said vibration sensor, and to said vibration severity life monitor.

26. The apparatus as recited in claim 22, further comprising:

a crankshaft sensor for detecting a crankshaft rpm value for the press.

27. The apparatus as recited in claim 22, further comprising:

a display device for displaying information tabulated, stored and computed in said vibration severity life monitor, said display device communicatively connected to said vibration severity life monitor.

28. The apparatus as recited in claim 22, wherein said vibration sensor, comprises:

an accelerometer.

29. The apparatus as recited in claim 22, wherein said vibration severity life monitor comprises:

a microprocessor.

30. The apparatus as recited in claim 22, further comprising:

a first tamper proof housing, said first tamper proof housing surrounding said vibration severity life monitor.

31. The apparatus as recited in claim 24, further comprising:

a second tamper proof housing, said second tamper proof housing surrounding said sensor security device.

32. The apparatus as recited in claim 25, wherein said zone factor device comprises:

a microprocessor.

* * * * *